Dec. 6, 1960   H. KOREN ET AL   2,962,765
IMPROVED PRODUCTION OF REGENERATED CELLULOSE
FILM BY THE CUPRAMMONIUM PROCESS
Filed March 26, 1957
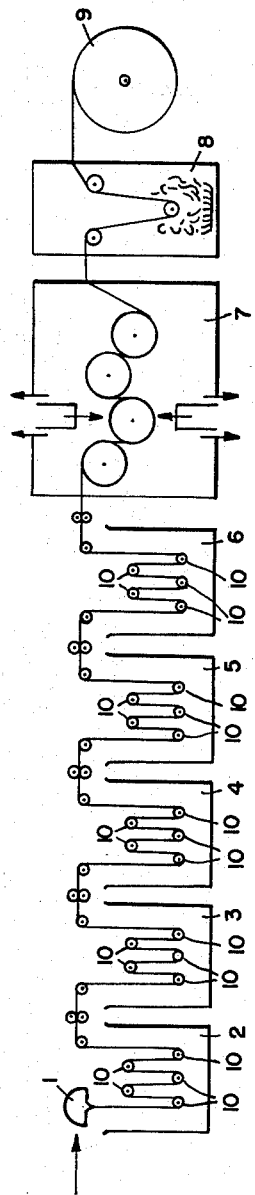
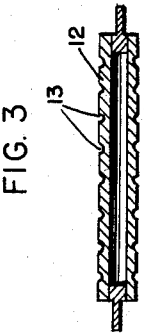
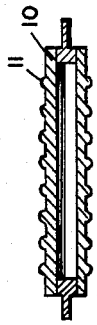
INVENTORS:
HERIBERT KOREN
FRANZ HOELKESKAMP
PAUL SCHUBERT
ROLF LINDER
BY
Margall, Johnston, Cook & Root
ATT'YS well-structured …

United States Patent Office

2,962,765
Patented Dec. 6, 1960

2,962,765

IMPROVED PRODUCTION OF REGENERATED CELLULOSE FILM BY THE CUPRAMMONIUM PROCESS

Heribert Koren, Franz Hoelkeskamp, and Paul Schubert, Wuppertal-Langerfeld, and Rolf Linder, Wuppertal-Barmen, Germany, assignors to J. P. Bemberg Aktiengesellschaft, Wuppertal-Oberbarmen, Germany Filed Mar. 26, 1957, Ser. No. 648,496

Claims priority, application Germany Mar. 27, 1956

6 Claims. (Cl. 18—57)

This invention relates to an improved method of producing a cellulose film, and more particularly, to an improved method of manufacturing a regenerated cellulose film by the cuprammonium process.

The production of a continuous cellulose film, band, ribbon or the like by the cuprammonium process can be accomplished by following a well known general procedure in which a viscous cuprammonium cellulose spinning solution is extruded in filmaceous form into an aqueous and preferably alkaline coagulating or precipitating bath. The extruded and coagulated film is then conducted or drawn through an acid "decoppering" bath in order to remove copper, after which the film is washed and dried.

In prior methods of making a cuprammonium cellulose film, very little attention has been directed to the initial and intermediate stages of the film formation, particularly in the extrusion and coagulation stages. For reasons of efficiency and in simulation of the methods employed in spinning fibers, the extruded film has been drawn off at the highest possible speed. In doing so, however, no importance has been attached to the difference between the speed at which the cuprammonium cellulose solution is extruded and the speed at which the film is drawn from the extruder through the coagulating bath. The usual procedure has been to stretch the film by 600% or more between the extruder and the first tensioning or drawing device such as a roller or similar conventional stretching means. In forming regenerated cellulose fibers or filaments, it is well known that this stretching in the initial stages imparts a longitudinal orientation to the cellulose molecules, i.e., they are oriented parallel to the fiber axis. This orientation has not been previously considered as having any deleterious effect upon film formation.

Prior processes of manufacturing cuprammonium cellulose films have been predominantly concerned with the necessity of producing a film having a uniform thickness. Because of the high degree of stretch to which the film is subjected and a subsequent non-uniform shrinkage, the simplest method of achieving a uniform thickness has been to employ an elongated casting or extrusion slot which is wider in the middle than at the edges. As the film is processed, the tensions applied to the middle portions and edge portions are unequal, but because of the initially enlarged middle portion, the film will assume a transverse cross-section of uniform thickness. In order to obtain a uniform thickness of predetermined size, the exact shape of the extrusion slot must be carefully correlated to the various longitudinal and lateral or transverse tensions to which the film is subjected throughout the process.

The longitudinal stretching tension applied to the film has also been disregarded in the conveyance of the film from one stage to the next or through individual stages such as decoppering, washing, and drying. Generally, a high tension has been employed to facilitate the movement of the film through the process, since the film is then pressed tightly against the rollers employed for this purpose.

One object of the present invention is to provide an improved method of producing a cellulose film by the cuprammonium process such that certain defects in the finished product caused by excessive stretching of the film can be substantially avoided.

Another object of the invention is to provide an improved method for manufacturing a "cuprammonium" cellulose film having a uniform thickness, a smooth surface, and a more uniform quality over its entire width with respect to such physical properties as tensile strength and elongation.

Still another object of the invention is to provide an improved method of producing a continuous cellulose film by the cuprammonium process whereby the finished product will exhibit desirable properties of both transverse strength and longitudinal extensibility.

Yet another object of the invention is to provide a method of producing a regenerated cellulose film by the cuprammonium process whereby the film will have an improved resistance to swelling caused by water absorption.

These and other objects and advantages of the invention will become more readily apparent upon a consideration of the following detailed description of the invention.

Upon careful examination and evaluation of the properties of a cellulose film produced by the ordinary cuprammonium process, we have discovered that the longitudinal orientation of the cellulose molecules caused by excessive stretching of the film is associated with a low transverse stability as well as with a small degree of extensibility. Furthermore, when beginning with an extruded film of varying cross-section, the finished film of uniform thickness has an undesirable variation in its properties from the middle to the edges thereof.

It has now been found, in accordance with the invention, that these deficiencies or harmful effects can be obviated if certain critical changes are made in the old procedure, particularly in those stages of the prior process which include extruding, coagulating, and decoppering, and also in the subsequent steps of washing and drying. The improvement consists essentially in extruding the cuprammonium cellulose solution as a film of uniform thickness and at a uniform extrusion speed over the transverse cross-section of the film, and conducting the extruded film through the remaining steps of the process including coagulation in an alkaline bath, copper removal in an acid bath, washing and drying while substantially avoiding stretching the film. Although a stretching of the film may not be entirely avoided, particularly in preventing lateral narrowing or shrinkage of the width of the film, nevertheless it is quite important that the longitudinal stretch of the film from the extrusion point to the finished product does not exceed 15 percent, and preferably should not exceed more than 3 percent.

Since the film is most easily stretched in a longitudinal direction immediately after extrusion and during coagulation, these initial stages of the process require special consideration. In the process of the invention, the cuprammonium cellulose solution is caused to emerge from an extrusion slot as a film of uniform thickness and at a uniform extrusion speed over the entire width of the extrusion slot. The extruded film is then drawn by a roller or similar film guiding or film conveying means at a drawing or conveying speed about equal to the extrusion speed, and, in any case, at a drawing speed no greater than 1.5 times the extrusion speed. The film is extruded directly into an aqueous coagulating bath which preferably has an alkaline concentration equal to 5 to 12 percent by weight of sodium hydroxide. Coagulating baths having an alkaline concentration within this range, are conventional in the art.

However, to obtain the optimum advantages of the invention, a sodium hydroxide concentration should be selected such that a lower concentration is employed at lower extrusion and drawing speeds and a higher concentration at higher speeds. For example, at a drawing speed of about 20 meters per minute, 5 to 6% NaOH in the bath is entirely adequate, whereas at a drawing-off speed of 70 meters per minute, it is advantageous to raise the concentration to from about 8 to 10%. The concentration at intermediate drawing speeds can be readily determined in relationship to the above values.

The process of the invention is capable of producing films having a thickness from as small as 0.007 mm. to as large as 0.045 mm., but is particularly advantageous in the formation of films having a uniform thickness of from 0.010 mm. to 0.028 mm. It will be readily apparent that the extruder means can be so constructed as to provide an extrusion slot of adjustable width, thereby facilitating any desired change of film thickness during the process. Furthermore, the lips forming the two elongated edges of the extrusion slot can be easily adjusted with extreme precision.

In order to further ensure a uniform thickness of the extruded solution and also to achieve a uniform extrusion speed, a uniform distribution of pressure should be applied to the solution as it is forced through the extrusion slot. For this purpose, a suitable pressure regulating means must form a part of the extruder. For example, the extrusion or spinning solution can be passed through a distributing tube provided with a plurality of holes or apertures over its entire width, corresponding to the width of the slot. The size and location of the holes in the distributing tube can be easily determined by routine experimentation so as to establish a uniform pressure. Also, sieves, nets, or similar foraminous plates or screens can be installed in the extruder to act as obstacles to regulate the pressure. Various conventional means of obtaining a uniform extrusion pressure can be adapted from the art.

The process of the invention is primarily based upon the principle that a cellulose film of completely uniform properties can be obtained only if a longitudinal orientation of the cellulose molecules is successfully avoided, i.e., by substantially avoiding a longitudinal stretching tension upon the film throughout its manufacture. Thus, distortion of the extruded solution film can be avoided by regulating the drawing-off speed to the solution extrusion speed. As noted above, a peripheral drawing speed which exceeds the extrusion speed by 50% is an absolute maximum. Although this initial ratio of drawing speed to extrusion speed of about 1:1 to 1.5:1 is of first importance, additional film handling and various chemical reactions or procedures should also be precisely controlled to obtain the maximum benefits of the invention. For instance, it has already been pointed out that the concentration of sodium hydroxide in the coagulating bath should be carefully adjusted in relation to the speed at which the film is drawn off from the extruder.

Another important feature of the invention relates to the production of a regenerated cellulose film which will exhibit a higher resistance to swelling. A low swelling capacity, i.e., a high resistance to swelling, is usually accepted as a criterion of film quality. In previous processes, relatively low concentrations of cellulose in the cuprammonium cellulose solution have been employed. We have now found, however, that the swelling properties of the finished film can be considerably improved by raising the concentration of cellulose in the spinning or extruding solution to from about 8 to 12% by weight of cellulose. An optimum resistance to swelling is obtained at a concentration of about 12% by weight of cellulose as will be readily observed from the following table in which the degree of swelling is shown in terms of water absorption:

| Cellulose Concentration, Percent by Weight of Extruding Solution | Water Absorption, Percent by Weight of Dry Film [1] |
| --- | --- |
| 7.9 | 590 |
| 9.7 | 490 |
| 10.4 | 480 |
| 12.1 | 390 |

[1] Determined before drying process.

In addition to the above important aspects of the process of the invention, it is advantageous to conduct the extruded and coagulated film to the acid "decoppering" bath while avoiding a reduction of swelling of the film. At the coagulation the film is in a highly swollen state and this degree of swelling should be maintained until the film enters the acid bath. At the same time, the film should be conducted or conveyed from the coagulating bath to the acid bath while substantially avoiding a longitudinal stretching tension. The manner in which the film is thus conducted to or through the stages of the process subsequent to extrusion is more fully set forth hereinafter.

In the cuprammonium process for producing a cellulose film by the method of this invention, the first and greatest shrinkage of the film takes place in the acid "decoppering" bath. During this acidification of the film, the degree of swelling drops from about 900% to 400% as expressed by weight of water absorbed with reference to the dry film. This appreciable escape of water is, of course, accompanied by a considerable reduction in volume of the cellulose film.

Therefore, it is important that the width of the film be maintained during this contraction of volume in the acid bath, and also that the uniform thickness of the film also be maintained. This result can be accomplished by placing the film under lateral or transverse tension during shrinkage, e.g., as it passes through the acid bath. In addition, the film should be simultaneously subjected to a longitudinal tension in order to prevent a distortion in the film resulting in a non-uniform thickness. Since both lateral and longitudinal tensioning forces are applied in this step, such forces can be easily regulated to avoid any deleterious orientation of cellulose molecules. In practice, the ratio of lateral to longitudinal pull upon the film should be limited to from about 1:1 to 1.5:1. Generally, the lateral tension should provide an excess of lateral stretch over longitudinal stretch by an amount equivalent to the longitudinal stretch applied in the prior extruding and coagulation stages, thereby tending to equalize any previous distortion.

By suitable means, such as roughened surfaces and a small separation of the drying rollers, the effect of this favorable relation between longitudinal and transverse tensions achieved during acidification should be carefully maintained.

The invention contemplates the use of film conducting rollers or similar film guiding and conveying means which are conventional in the art and which are illustrated in Figs. 2 and 3 of the accompanying drawing. For example, it has previously been suggested that slipping of the film as it is conducted on the peripheral surface of the conveying rollers be avoided by providing rollers having a rough or irregular peripheral surface in the form of surface indentations or slight projections. By using these or similar devices, the film can be conducted or conveyed to or through each stage of the process without applying any substantial longitudinal stretching tension which might otherwise be required to tension the film between each roller for proper conveyance. Of course, these irregularly surfaced rollers may also be employed to provide a longitudinal stretching tension in the usual manner of rotating one roller at a greater speed than the preceding roller. Thus, the use of such rollers is preferred in each of the coagulating and decoppering baths as well as in the subsequent washing and drying steps and in conveying the film between the different stages of the process. In this way, the uniform thickness and uniform properties over the width of the film can be preserved and more closely regulated throughout the process. When drying the film, a small amount of stretching tension is preferably applied to the film in order to produce a smooth surface, but such tension should only be sufficient to accomplish this specific function.

The invention is further illustrated by the following example in which percentages are expressed by weight unless otherwise indicated. It will be readily understood by those skilled in the art that the example is illustrative only and not exclusive, and that changes or additions can be made as regards certain features of the process without departing from the spirit and scope of the invention. For convenience in understanding the invention, the various steps in the example are illustrated in schematic form by the accompanying drawing wherein Fig. 1 shows the overall process and Figs. 2 and 3 show two types of conventional rollers.

*Example*

A viscous cuprammonium cellulose solution is prepared in a conventional manner preparatory to extrusion. The solution is led to an extrusion head 1 provided with means to regulate and uniformly distribute the pressure on the solution as it is extruded at a uniform speed through an extrusion slot having a uniform width of 0.20 mm. and a length of 2500 mm. The solution is thus extruded in filmaceous form at an extrusion speed of 50 meters per minute into an aqueous coagulating bath 2 containing 10% NaOH. The film is drawn around a first roller in the coagulating bath at a speed of 70 meters per minute so that 40 percent longitudinal stretching of the film occurs. The film is then conducted or conveyed by additional rollers to an acid decoppering bath 3 containing 5% sulfuric acid such that substantially no longitudinal tension is applied to the film and also such that the degree of swelling is not affected.[1] Next, the film is drawn through the acid baths 4 and 5 while simultaneously applying a sufficient lateral tension to maintain the width of the film and applying a longitudinal tension whereby the ratio of lateral to longitudinal pull is 1:1. The lateral tension is most conveniently applied by rollers 10 with roughened surfaces (traction sleeves), such as the rollers with protrusions 11 around the peripheral surface as indicated in Fig. 2. A roughened surface can also be obtained with peripheral indentations 13 as shown on roller 12 in Fig. 3.

The acidified film from which most of the copper has been removed is subsequently washed in bath 6 and dried in chamber 7, care being taken to apply as little longitudinal tension as possible, during these steps. A small amount of tension is applied while drying, just sufficient to impart a smooth surface to the film. After drying, the film can be moisture conditioned in a conventional manner in steam chamber 8 and finally taken up on roll 9.

The rollers employed for conveying the film in and between each stage of the process are constructed to provide an irregular or indented peripheral surface, thereby facilitating uniform conveyance and regulation of a minimum longitudinal tension.

The resulting smooth surfaced cellulose film has a uniform thickness of 0.020 mm. and a swelling value of 140% expressed as water absorption based on the dry film. The physical properties are highly uniform over the entire width and length of the film.

[1] Before it enters the acid bath.

The term "longitudinal" is employed herein to refer to the direction in which the film travels through the process. The term "stretching" is employed herein to define a longitudinal or lateral elongating deformation of the film.

The invention is hereby claimed as follows:

1. In the method of producing a cellulose film by the cuprammonium process, the improvement which comprises: extruding a cuprammonium cellulose solution through an extrusion slot as a film of uniform thickness and at a uniform extrusion speed over the width of the extrusion slot; drawing off the extruded film at a speed of about 1 to not greater than 1.5 times the extrusion speed through an aqueous coagulating bath having an alkaline concentration equal to 5 to 12 percent by weight of sodium hydroxide; conducting the coagulated film to an acid bath while substantially avoiding a longitudinal stretching tension and a reduction of swelling of the film; drawing the coagulated film through the acid bath while maintaining the width of the film substantially without change during film shrinkage by keeping the film under transverse tension in the acid bath and simultaneously subjecting the film to longitudinal tension such that the ratio of lateral to longitudinal pull upon the film is about 1:1 to 1.5:1; and washing and drying the film while substantially avoiding a longitudinal stretching tension of the film.

2. An improved method of producing a cellulose film as defined in claim 1 wherein the cuprammonium cellulose solution being extruded has a concentration of from 8 to 12 percent by weight of cellulose.

3. An improved method of producing a cellulose film as defined in claim 1 wherein the cuprammonium cellulose solution being extruded has a concentration of about 12 percent by weight of cellulose.

4. In the method of producing a cellulose film by the cuprammonium process, the improvement which comprises: extruding a cuprammonium cellulose solution containing from 8 to 12% by weight of cellulose through an extrusion slot as a film of uniform thickness and at a uniform extrusion speed over the width of the extrusion slot; drawing off the extruded film at a speed of about 1 to not greater than 1.5 times the extrusion speed through an aqueous coagulating bath having an alkaline concentration equal to 5 to 12% by weight of sodium hydroxide; conducting the coagulated film to an acid bath while substantially avoiding a longitudinal stretching tension and a reduction of swelling of the film; drawing the coagulated film through the acid bath while maintaining the width of the film substantially without change during film shrinkage by keeping the film under transverse tension in the acid bath and simultaneously subjecting the film to longitudinal tension such that the ratio of lateral to longitudinal pull upon the film is about 1:1 to about 1.5:1; and washing and drying the film while substantially avoiding a longitudinal stretching tension of the film, the longitudinal stretch of the film from the extrusion point to the finished product not exceeding 15%.

5. The improved method of claim 4 wherein the longitudinal stretch of the film from the extrusion point to the finished product does not exceed 3%.

6. In the method of producing a cellulose film by the cuprammonium process, the improvement which comprises: extruding a cuprammonium cellulose solution as a film of uniform thickness and at a uniform extrusion speed; drawing off the extruded film at a speed of about 1 to not greater than 1.5 times the extrusion speed through an aqueous coagulating bath having an alkaline concentration equal to 5–12% by weight of sodium hydroxide; conducting the coagulated film to an acid bath while substantially avoiding a longitudinal stretching tension and a reduction of swelling of the film; drawing the coagulated film through the acid bath while maintaining the width of the film substantially without change during film shrinkage by keeping the film under transverse tension in the acid bath and simultaneously subjecting the film to longitudinal tension in the acid bath in an amount such that the lateral stretch imparted to the film in the acid bath exceeds the longitudinal stretch in the acid bath by an amount about equal to the amount of longitudinal stretch applied to the film in the prior extruding and coagulation stages; and washing and drying the film while substantially avoiding a longitudinal stretching tension of the film.

References Cited in the file of this patent

UNITED STATES PATENTS

| | | |
|---|---|---|
| Re. 22,950 | Czapek | Dec. 23, 1947 |
| 1,979,403 | Ostermann | Nov. 6, 1934 |
| 2,035,645 | Etykorn et al. | Mar. 31, 1936 |
| 2,115,132 | Alles et al. | Apr. 26, 1938 |
| 2,144,356 | Alles | Jan. 17, 1939 |
| 2,285,147 | Czapek | June 2, 1942 |
| 2,698,967 | Reichel et al. | Jan. 11, 1955 |